United States Patent [19]

Aomori

[11] Patent Number: 4,623,183
[45] Date of Patent: Nov. 18, 1986

[54] ROBOT HAND

[75] Inventor: Koukichi Aomori, Yokohama, Japan

[73] Assignee: Kabushiki Kaisha Toshiba, Kawasaki, Japan

[21] Appl. No.: 654,028

[22] Filed: Sep. 25, 1984

[30] Foreign Application Priority Data

Sep. 30, 1983 [JP] Japan .................................. 58-182755

[51] Int. Cl.⁴ .............................................. B66C 1/10
[52] U.S. Cl. .................................. 294/86.4; 294/106; 414/730
[58] Field of Search ..................... 294/106, 86.4, 87.1, 294/119.3, 98.1, 907; 414/735, 730; 901/30, 33, 39; 3/12.7, 12.6, 12.8

[56] References Cited

U.S. PATENT DOCUMENTS

| | | | |
|---|---|---|---|
| 3,739,923 | 6/1973 | Totsuka | 414/730 |
| 3,866,966 | 2/1975 | Skinner | 294/106 |
| 3,901,547 | 8/1975 | Skinner | 294/88 |
| 4,105,241 | 8/1978 | Moe | 294/86.4 |
| 4,149,278 | 4/1979 | Frosch | 3/12.5 |
| 4,246,661 | 1/1981 | Pinson | 3/12.7 |

FOREIGN PATENT DOCUMENTS 0076135  6/1983  European Pat. Off. .

OTHER PUBLICATIONS

5th International Symposium on Idustrial Robots, Society of Manufacturing Engineers, 1975.

Primary Examiner—James B. Marbert
Attorney, Agent, or Firm—Oblon, Fisher, Spivak, McClelland & Maier

[57]  ABSTRACT

A robot arm includes an outer casing and three rotating members of different diameters coaxially disposed in the outer casing for relative rotation and rockably supporting the proximal end portions of three fingers. These fingers are rocked against the rotating members in a plane including a central axis of the outer casing and rotated to change the relative angles between the fingers by selectively rotating the members around the central axis of the outer casing to prescribed positions.

8 Claims, 7 Drawing Figures

F I G. 4
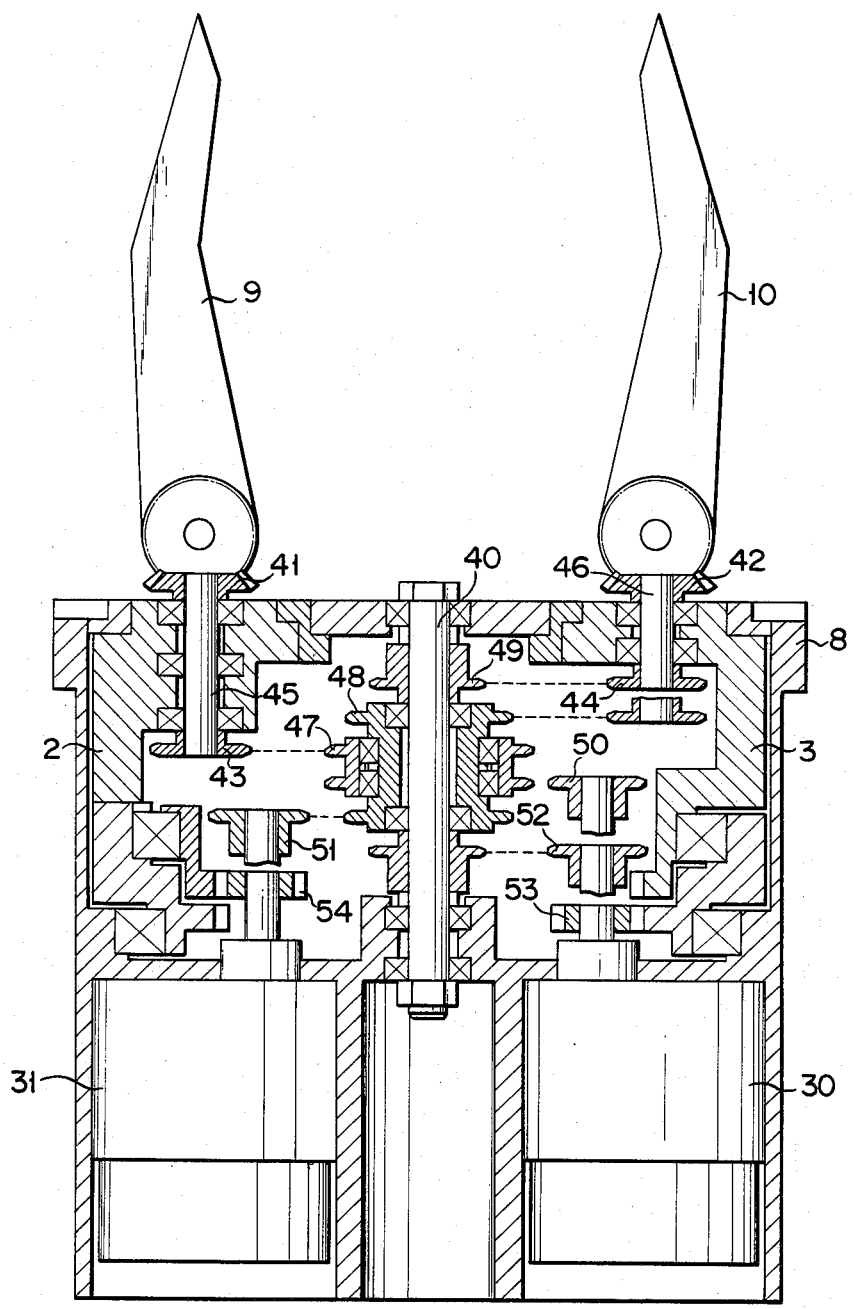

ROBOT HAND

BACKGROUND OF THE INVENTION

The present invention relates to a robot hand capable of a stable grasping action, irrespective of the shape of an object to be grasped, and improved in flexibility and adaptability to circumstances.

Some conventionally used robots are provided with two or three fingers at a robot hand section attached to the distal end of a robot arm. Generally, according to the robots of this type, an object to be grasped is positioned in the central portion of the robot arm and is grasped by the fingers rocked correspondingly. In this case, the degree of freedom of the robots is 1.

In the robot hands where the degree of freedom is "1", however, it is necessary to adapt the shapes of the fingers to that of the object. Otherwise, the shape of the object needs to be adjusted to those of the robot fingers. In handling objects of various shapes by such a conventional robot, therefore, the robot hand or fingers must be replaced with every object change, thus complicating the operation.

In order to eliminate such awkwardness, robot hands are proposed in which the individual fingers are varied in rocking directions to change and adjust their configurations to the object to be grasped, thereby improving the stability of the grasping action. However, these robot hands lack in adaptability to circumstances and in flexibility to vary with the posture or position of the grasped object. Such flexibility and adaptability require an increase in the degree of freedom. Thus, the robot hand section would become more complicated in structure and larger in size.

SUMMARY OF THE INVENTION

The present invention is contrived in consideration of these circumstances and is intended to provide a robot hand capable of stably grasping objects of various shapes without requiring a further complicated structure, improved in adaptability to circumstances, and improved in flexibility to vary with the posture or position of the grasped objects.

BRIEF DESCRIPTION OF THE DRAWINGS

FIG. 4 is a sectional view showing a robot hand section according to another embodiment of the invention.

DETAILED DESCRIPTION OF THE PREFERRED EMBODIMENTS

An industrial robot hand according to one embodiment of the present invention will now be described with reference to the accompanying drawings.

Figure 1:
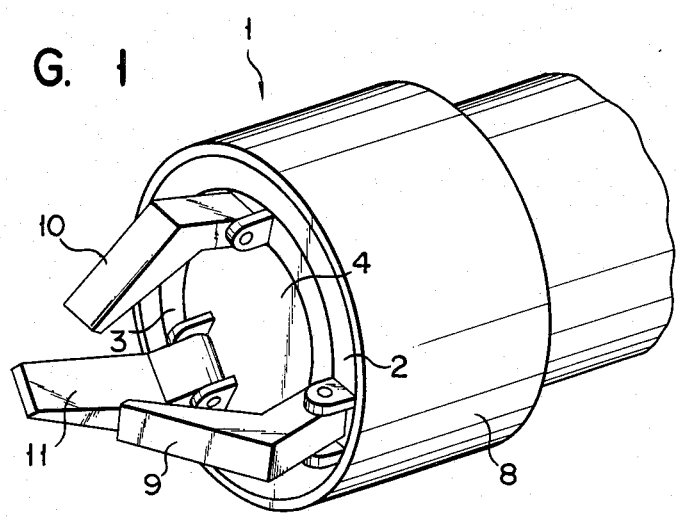
FIG. 1 is a perspective view showing a hand section of an industrial robot hand according to one embodiment of the present invention.
Figure 2A:
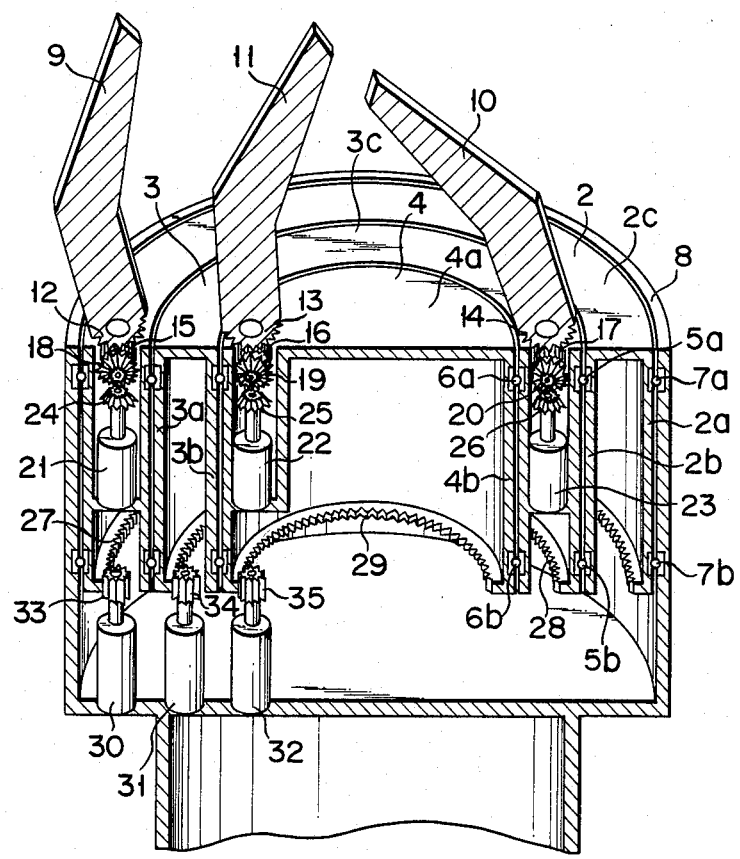
FIGS. 2A and 2B are a sectional view and a partial enlarged sectional view, respectively, showing the hand section.
Figure 2B:
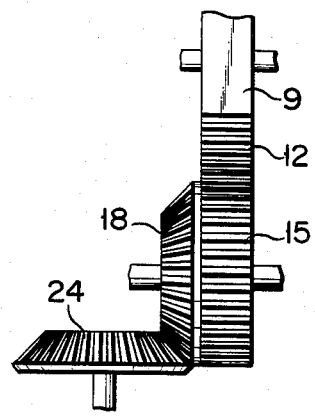
Figure 3A:
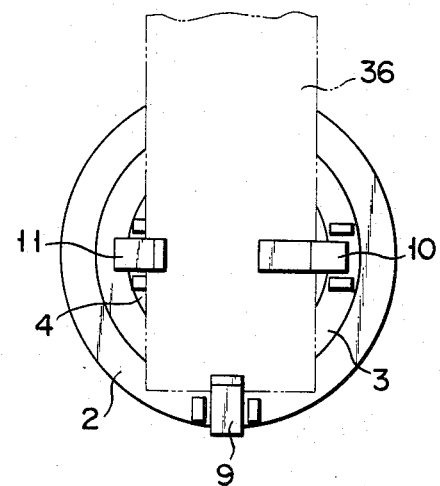
FIGS. 3A, 3B and 3C are views for showing various manners in which the hand section grasps objects.
Figure 3B:
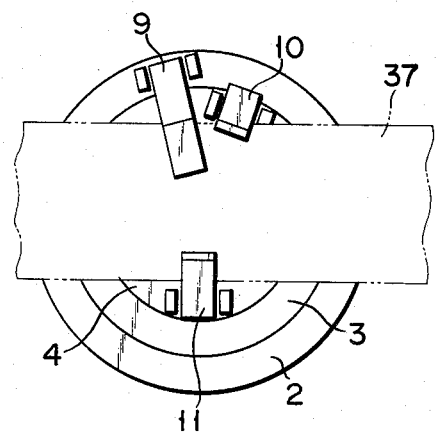
Figure 3C:
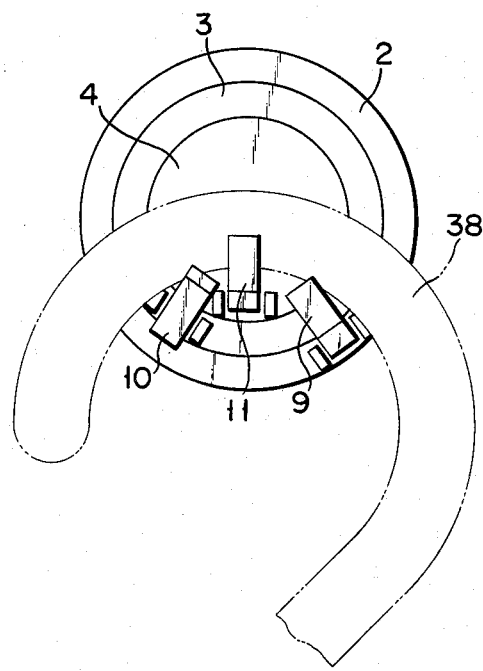

In FIGS. 1, 2A and 2B, numeral 1 designates a robot hand section attached to the distal end of a robot arm. The hand section 1 is provided with three cylindrical rotating members 2, 3 and 4 with long, medium and short diameters which are coaxially arranged so as to be substantially flush with one another on both end sides. Among these rotating members 2, 3 and 4, the large- and medium-sized rotating members 2 and 3 have a double-wall structure, consisting of outer cylinders 2a and 3a and inner cylinders 2b and 3b, respectively. These outer and inner cylinders of the rotating members are coupled to each other by bottom walls 2c and 3c formed integrally with the cylinders on the one end side. Bearings 5a and 5b are interposed between the inner cylinder 2b of the large-sized rotating member 2 and the outer cylinder 3a of the medium-sized rotating member 3 so that the two rotating members 2 and 3 are connected for relative rotation. The small-sized rotating member 4 is in the form of a bottom cylinder having a bottom wall 4a on the one end side. Bearings 6a and 6b are interposed between the outer surface of a peripheral wall 4b of the small-sized rotating member 4 and the inner surface of the inner cylinder 3b of the medium-sized rotating member 3, so that the two rotating members 4 and 3 are connected for relative rotation. Bearings 7a and 7b are interposed between the outer peripheral surface of the outer cylinder 2a of the large-sized rotating member 2 and the inner peripheral surface of an outer casing 8, which is formed integrally with the robot arm. Thus, the rotating member 2 is supported inside the outer casing 8 so that it may rotate relative to the outer casing 8. The bottom surfaces of the rotating members are substantially flush with the bottom end face of the outer casing 8.

The respective bottom walls 2c, 3c and 4a of the rotating members 2, 3 and 4 are fitted, respectively, with the proximal end portions of three fingers 9, 10 and 11 which extend outward and are bent toward the rotational common axis of the rotating members. The distal end portions of the fingers 9, 10 and 11 may rock toward the rotational axis within planes containing the rotational axis.

The proximal end portions of the fingers 9, 10 and 11 penetrate the bottom walls 2c, 3c and 4a, respectively, and are located within their corresponding rotating members. External teeth 12, 13 and 14 are formed on the proximal end faces of the fingers 9, 10 and 11, respectively. The external teeth 12, 13 and 14 are in mesh with coupling gears 15, 16 and 17, respectively, which may rotate around axes perpendicular to the rotational axis of the rotating members. Bevel gears 18, 19 and 20 are coaxially, integrally attached to the coupling gears 15, 16 and 17, respectively. The bevel gears 18, 19 and 20 are in mesh with bevel gears 24, 25 and 26, respectively, mounted coaxially on the rotating shafts of the motors 21, 22 and 23, which are fixed to the rotating members 2, 3 and 4, respectively.

In the finger rocking mechanism constructed in this manner, the fingers 9 to 11 are independently rocked or rotated through the medium of their corresponding gear mechanisms as the motors 21, 22 and 23 are driven.

Internal teeth 27, 28 and 29 are formed on the top-side end faces of the outer cylinders 2a and 3a of the rotating members 2 and 3 and the peripheral wall 4b of the rotating member 4, respectively. The internal teeth 27, 28 and 29 are in mesh with output gears 33, 34 and 35, respectively, mounted coaxially on the rotating shafts of motors 30, 31 and 32, respectively, which are fixedly housed in the outer casing 8.

In the finger rotating mechanism of the abovementioned construction, the fingers 9 to 11 are independently rotated around the rotational axis of the outer casing 8 through the medium of gear mechanisms and the rotating members as the motors 30, 31 and 32 are driven.

Thus, according to the embodiment described above, the fingers 9, 10 and 11 are attached to the rotating members 2, 3 and 4, respectively, which are independently rotated by the motors 30, 31 and 32, respectively. Accordingly, the relative positions of the fingers can be varied according to the shape of an object to be grasped, ensuring highly flexible grasping action.

Also, the posture of the grasped object may be changed by moving the rotating members 2 to 4 through the same angle in the same direction. The robot hand having the three fingers may enjoy high level functions such that two of the fingers hold and change the posture of the object and the third finger and one of the two fingers replace the object with another. Thus, the robot hand according to the invention is greatly improved in flexibility and in adaptability to circumstances. Moreover, it is unnecessary to increase the degree of freedom for the change of the posture of the object, so that the robot hand will not be further complicated in structure.

Referring now to FIG. 4, a second embodiment of the invention will be described. In the description of this second embodiment, like reference numerals are used to designate like members having substantially the same functions as in the first embodiment, and a description of those members is omitted or simplified.

A coaxially extending shaft 40 is rotatably supported in the center of an outer casing 8. Three rotating members (only two members 2 and 3 are shown in FIG. 4) are arranged at equal distances from the shaft 40. These rotating members are supported on the outer casing 8 by means of bearings so as to be rotatable around the central axis of the outer casing 8. The rotating members are arranged at intervals along the circumference of a circle. Fingers 9 and 10 are rockably supported on the rotating members 2 and 3, respectively. Also, the rotating members 2 and 3 rotatably support shafts 45 and 46 which are coaxially fitted with bevel gears 41 and 42 at one end and sprockets 43 and 44 at the other end, respectively. The bevel gears 41 and 42 are in mesh with bevel gears formed on the proximal end portions of the fingers, individually. The sprocket 43 is connected to a first central sprocket 47 by means of an endless chain. The first central sprocket 47 is supported around a second central sprocket 48 by means of bearings for coaxial rotation. The second central sprocket 48 is supported around the shaft 40 by means of bearings for coaxial rotation. A third central sprocket 49 is mounted on the shaft 40 so as to be rotatable therewith. The third central sprocket 49 is connected to the sprocket 44 by means of an endless chain. The second central sprocket 48 is connected to the third finger (not shown) by means of a chain and a gear mechanism, whereby the third finger is rocked. The first, second and third central sprockets 47, 48 and 49 are connected to driving sprockets 50, 51 and 52, respectively, by means of sprockets integral with the first to third sprockets and chains. The driving sprockets are connected to and rotated by fixed motors (not shown) disposed in- or outside the outer casing 8. Thus, as in the first embodiment, the three fingers can independently be rocked toward the axis of rotation. In this second embodiment, the motors need not be fixed to the rotating members, so that the motors for rotating the rotating members do not require high outputs.

Gears are formed individually on the lower portions of the inner surfaces of the rotating members 2 and 3. These gears are in mesh with pinions 53 and 54 which are coaxially mounted on the rotating shafts of the motors 30 and 31, respectively. Thus, the first and second rotating members 2 and 3 are rotated as the motors 30 and 31 are driven. The third rotating member (not shown) is rotated by a similar mechanism.

In the first embodiment, the loci of rotation of the three rotating members are different, so that the rotating members can rotate through 360° or more without interfering with one another. In the second embodiment, however, the loci of rotation of the rotating members are coincident, so that the range of rotation of each rotating member is limited, that is, the rotating members cannot make a wide relative movement.

Although the fingers according to the above embodiments are three, they may alternatively be two or four or more. Moreover, all the fingers need not be rotatable but at least one of them needs to be so. In the case where three fingers are used, for example, one or two of them may be designed for rotation relative to the outer casing, leaving the third one fixed to the outer casing. The setting of the rotatable and fixed fingers may depend on the purpose of use. In the above embodiments, furthermore, motors are provided individually for the rocking and rotating the fingers, that is, six motors are used to drive the three fingers. Alternatively, the motors may be reduced in number by incorporating a delay means, force dividing means or other suitable conventional means in the transmission mechanisms connecting the motors and the fingers. The drive sources are not limited to motors, and a hydraulic means may be used for the purpose.

What is claimed is:

1. A robot hand attached to the distal end of a robot arm, comprising:
    a main body fixed to the arm;
    a plurality of fingers;
    supporting means attached to the main body and rockably supporting at least one of the fingers;
    first driving means for rocking the fingers; and
    second driving means for rotating at least one of said supporting means to change the relative angles between the fingers, wherein said main body includes an outer casing, and said supporting means comprise a plurality of rotating members coaxially disposed in the outer casing for relative rotation and each said rotating member rockably supports the proximal end portion of one of the fingers.

2. The robot hand according to claim 1, further comprising means for rotatably supporting the rotating members so that the loci of rotation of the rotating members are different.

3. The robot hand according to claim 1, wherein said first driving means includes a plurality of driving members fixed individually to the rotating members.

4. The robot hand according to claim 3, wherein said second driving means includes a plurality of driving members independently provided to rotate the rotating members individually.

5. The robot hand according to claim 4, wherein said fingers are three in number, said rotating members are three in number and have different diameters, said first driving means includes first, second and third motors fixed individually to the three rotating members and gear mechanisms for transmitting the rotatory forces of the first to third motors to their corresponding fingers to rock the same, and said second driving means includes fourth, fifth and sixth motors fixed to the outer casing and gear mechanisms for transmitting the rotatory forces of the fourth to sixth motors to their corresponding rotating members to rotate the same.

6. The robot hand according to claim 1, further comprising means for supporting the rotating members so that the loci of rotation of the rotating members are coincident.

7. The robot hand according to claim 6, wherein said rotating members are arranged at regular intervals in the circumferential direction so as to be rotatable along the circumference of one and the same circle.

8. The robot hand according to claim 7, wherein said first driving means includes a plurality of driving members provided independently of the rotating members, a plurality of drive transmitting mechanisms attached individually to the rotating members, and a plurality of connecting means for connecting the driving members and the drive transmitting mechanisms.

* * * * *